United States Patent
Lepeska et al.

(10) Patent No.: US 10,789,325 B2
(45) Date of Patent: Sep. 29, 2020

(54) SYSTEMS AND METHODS FOR PREFETCHING DYNAMIC URLS

(71) Applicant: VIASAT, INC., Carlsbad, CA (US)

(72) Inventors: Peter J Lepeska, Boston, MA (US); Devin R Toth, Quincy, MA (US)

(73) Assignee: VIASAT, Inc., Carlsbad, CA (US)

( * ) Notice: Subject to any disclaimer, the term of this patent is extended or adjusted under 35 U.S.C. 154(b) by 250 days.

(21) Appl. No.: 15/755,928

(22) PCT Filed: Aug. 26, 2016

(86) PCT No.: PCT/US2016/049023
§ 371 (c)(1),
(2) Date: Feb. 27, 2018

(87) PCT Pub. No.: WO2017/040297
PCT Pub. Date: Mar. 9, 2017

(65) Prior Publication Data
US 2018/0357326 A1    Dec. 13, 2018

Related U.S. Application Data

(60) Provisional application No. 62/211,246, filed on Aug. 28, 2015.

(51) Int. Cl.
*G06F 16/957* (2019.01)
*G06F 16/955* (2019.01)

(52) U.S. Cl.
CPC ...... *G06F 16/9574* (2019.01); *G06F 16/9566* (2019.01)

(58) Field of Classification Search
CPC .................. G06F 16/9566; G06F 16/9574
See application file for complete search history.

(56) References Cited

U.S. PATENT DOCUMENTS

| 6,085,193 A | 7/2000 | Malkin et al. |
| 7,103,714 B1 | 9/2006 | Jacobs et al. |

(Continued)

FOREIGN PATENT DOCUMENTS

| WO | WO-2010/081160 A2 | 7/2010 |
| WO | WO-2017/040297 A1 | 3/2017 |

OTHER PUBLICATIONS

International Search Report and Written Opinion mailed in International (PCT) Application No. PCT/US2016/049023 dated Nov. 21, 2016, 11 pgs.

(Continued)

*Primary Examiner* — Gil H. Lee
(74) *Attorney, Agent, or Firm* — Kilpatrick Townsend & Stockton, LLP

(57) ABSTRACT

The present disclosure relates to prefetching dynamic URLs. For example, one disclosed method includes the steps of receiving breadcrumb information from a first client device, the breadcrumb information comprising a dynamic URL, a dynamically-generated value, and an indication of a method of generating the dynamically-generated value; determining a template for the dynamic URL based on the dynamically-generated value and the method of generating the dynamically-generated value; receiving a request for a hint for the URL; and in response to receiving the request for the hint from a second client device, transmitting the template for the dynamic URL to the second client device.

24 Claims, 8 Drawing Sheets

(56) References Cited

U.S. PATENT DOCUMENTS

| | | |
|---|---|---|
| 8,335,838 B2 | 12/2012 | Zhang et al. |
| 8,341,245 B1 | 12/2012 | Roskind et al. |
| 8,478,843 B1 | 7/2013 | Ortlieb et al. |
| 8,707,442 B1 * | 4/2014 | Lax .................... H04N 21/2541 726/26 |
| 9,083,583 B1 | 7/2015 | Roskind et al. |
| 9,135,364 B1 | 9/2015 | Sundaram et al. |
| 2002/0010761 A1 | 1/2002 | Carneal et al. |
| 2004/0193676 A1 | 9/2004 | Marks |
| 2006/0129463 A1 * | 6/2006 | Zicherman ............ G06Q 30/02 705/14.73 |
| 2008/0091685 A1 * | 4/2008 | Garg .................... G06F 16/951 |
| 2008/0114773 A1 | 5/2008 | Choi et al. |
| 2008/0222244 A1 | 9/2008 | Huang et al. |
| 2008/0228938 A1 | 9/2008 | Plamondon |
| 2008/0229020 A1 | 9/2008 | Plamondon |
| 2008/0229023 A1 | 9/2008 | Plamondon |
| 2009/0063538 A1 | 3/2009 | Chitrapura et al. |
| 2011/0138012 A1 * | 6/2011 | Tiemann ................ G06F 17/24 709/217 |
| 2012/0030212 A1 * | 2/2012 | Koopmans ......... H04N 7/17318 707/741 |
| 2012/0191804 A1 * | 7/2012 | Wright .................... H04L 67/02 709/217 |
| 2013/0297561 A1 | 11/2013 | Mizrotsky et al. |
| 2015/0081438 A1 * | 3/2015 | Strutton ............ G06Q 30/0255 705/14.53 |
| 2015/0156194 A1 | 6/2015 | Modi et al. |

OTHER PUBLICATIONS

International Preliminary Report on Patentability mailed in International (PCT) Application No. PCT/US2016/049023 dated Mar. 15, 2018, 8 pgs.

W3C, "Resource Hints", W3C Working Draft Feb. 25, 2016, http://www.w3.org/TR/2016/WD-resource-hints-20160225/, 13 pgs.

\* cited by examiner

| Root | Subresource |
|---|---|
| http://www.cnn.com/ | https://www.cnn.com/large_logo.png  310a |
| http://www.cnn.com/ | https://www.cnn.com/small_logo.png  310b |
| http://www.cnn.com/ | https://www.cnn.com/social_media.png  310c |
| http://www.cnn.com/ | http://www.advertisement.com/advert=<RAND>  320a |
| http://www.cnn.com/ | http://www.cnn.com/empty.png?cbuster=<CURRENT_TIME>  320b |

| Page Loaded | Math.Random() Breadcrumbs | Date() Breadcrumbs | Subresource |
|---|---|---|---|
| http://www.amazon.com/ 410a | 4720992734, 4958694938, 420a 9876049878, 8985748987,... | 1433833200655, 1433833200757, 430a 1433833200757 | https://www.amazon.com/empty.gif?cbuster=1433833200757  440a |
| http://www.amazon.com/ 410b | 789874878, 678590987, 420b 8948987658, 8977895784 | 1433830714282, 1433830714546, 430b 1433830714555 | https://www.amazon.com/empty.gif?cbuster=1433830714282  440b |
| http://www.amazon.com/ 410c | 787589898, 8987857890, 420c 4958989298, 5768234902,... | 1433832383573, 1433830714546, 430c 1433830714555 | https://www.amazon.com/empty.gif?cbuster=1433832383573  440c |
| http://www.wikia.com/ 410d | 3375737483, 7890989878, 420d 2339098767,... | 1433830717777, 430d 1433830717789 | http://aax.amazon-adsystem.com?u=www.wikia.com&cb=3375737483  440d |
| http://www.wikia.com/ 410e | 4720992734, 4890909891, 420e 4349090923, 3234320909,... | 1433830718888, 430e 1433830718899 | http://aax.amazon-adsystem.com?u=www.wikia.com&cb=4720992734  440e |

SYSTEMS AND METHODS FOR PREFETCHING DYNAMIC URLS

CROSS-REFERENCE TO RELATED APPLICATIONS

The present application claims priority to U.S. Provisional Patent Application No. 62/211,246, filed Aug. 28, 2015, entitled "Systems and Methods for Prefetching Dynamic URLs," the entirety of which is hereby incorporated by reference.

BACKGROUND

A web page provided by a content server may create one or more dynamic uniform resource locators ("URLs") that may be uniquely generated every time the web page is rendered on a computing device. In such a case, a conventional prefetching system that prefetches objects using URLs that were created during prior renderings of the page will be unable to successfully fetch and use dynamic URLs: each time the dynamic URL is created, it will not match the dynamic URL previously fetched, and thus the prefetching system may not be able to match a request from a browser to a prefetched web resource.

SUMMARY

Various examples are described for systems and methods for prefetching dynamic URLs.

For example, one disclosed method includes the steps of receiving, as a part of a web page transaction, a web page document having one or more instructions to generate a dynamic URL; generating the dynamic URL based on the one or more instructions, the generating comprising generating a dynamically-generated value in accordance with a method of generating the dynamically-generated value specified in the instructions; and transmitting to a hinting server breadcrumbs from the web page transaction, the breadcrumbs comprising the dynamically-generated value and an indication of the method of generating the dynamically-generated value.

Another example method includes the steps of storing breadcrumb information comprising: identifications of generating methods for generating dynamic values, and for each of the generating methods, at least one dynamic value generated by the generating method; receiving a dynamic URL from a first client device, the dynamic URL comprising a first dynamically-generated value: determining a template for generating the dynamic URL based on the first dynamically-generated value and the breadcrumb information; and transmitting the template to a second client device in response to a request for hinting information corresponding to the dynamic URL.

A still further example method includes the steps of transmitting a hint request to a hinting server, wherein the hint request is for hinting information associated with a request for a URL from a browser that is part of a web page transaction with a content server; receiving from the hinting server a response to the hint request, the response comprising a template for a dynamic URL; generating the dynamic URL based on the template; and prefetching a web resource using the dynamic URL as part of the web page transaction.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 3 shows example hint information for prefetching dynamic URLs;

FIG. 4 shows example breadcrumbs for prefetching dynamic URLs;

DETAILED DESCRIPTION

Figure 1:
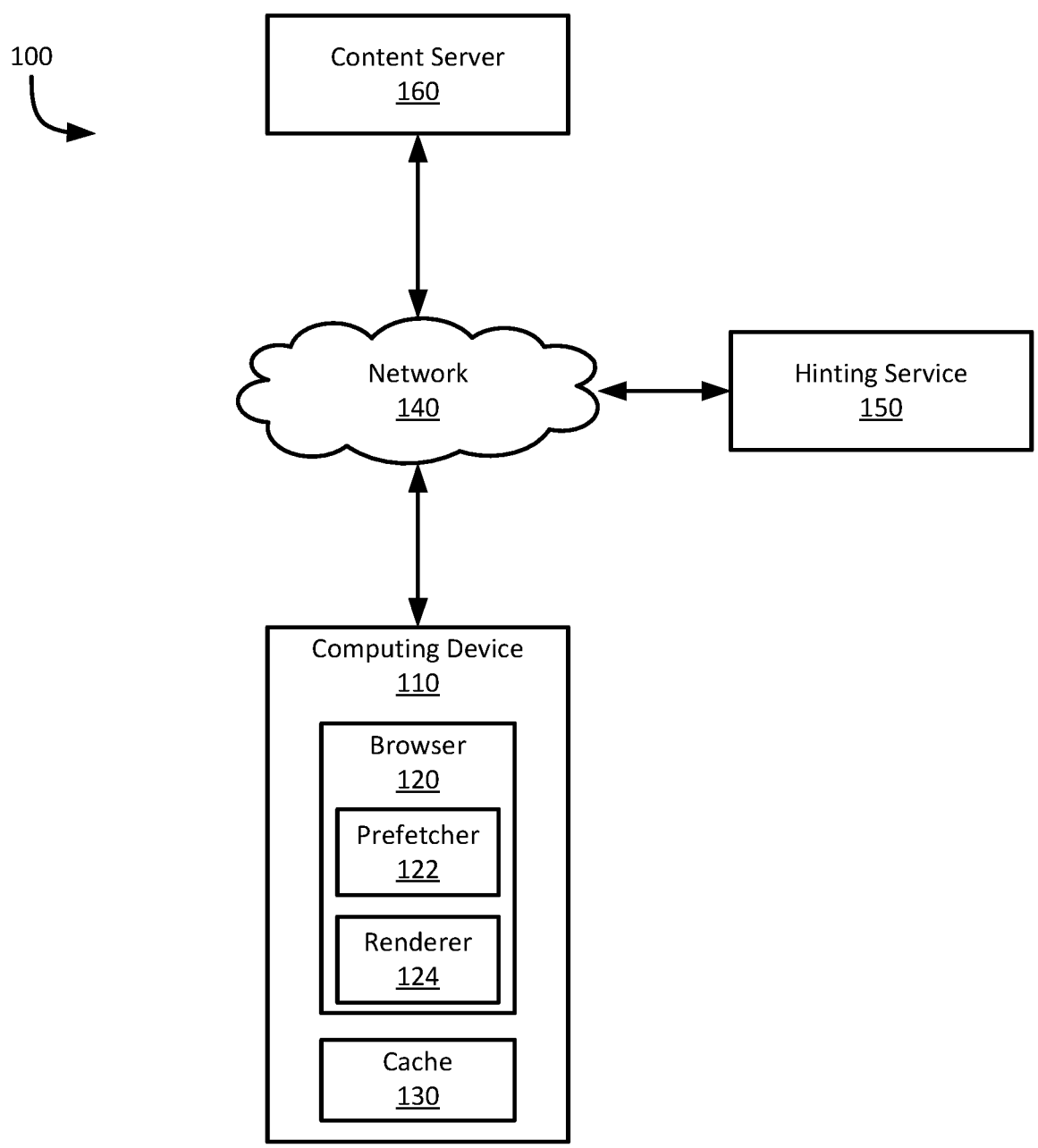
FIG. 1 shows an example system for prefetching dynamic URLs.

Examples are described herein in the context of systems and methods for prefetching dynamic URLs. Terms such as "resource," "web resource," "content," "web page," etc., when used herein in conjunction with the term "URL," refer generally synonymously to the object referenced by the URL, which can include additional sub-resources that are referenced in the object. Thus, for example, a "web page" can include a base HTML document and all content directly or indirectly referenced by the HTML document. References herein to "requesting," "fetching," and "prefetching" a URL (whether static or dynamic) mean requesting, fetching, or prefetching the object referenced by the URL. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Example of a Method for Prefetching Dynamic URLs

In this illustrative example, a user opens a web browser on her tablet computer and enters a URL for a web page she wants to visit. In this example, the user enters www.webpage.com. The web browser then issues a request to a web server for the web page located at www.webpage.com. In response, the web browser receives a hypertext markup language ("HTML") document from the web server corresponding to the requested web page. As the web browser parses the HTML document for display, it encounters URLs embedded within the document. The web browser extracts these URLs and issues requests for web resources from those URLs. Some of these URLs, however, are dynamically generated. For example, rather than only including static URLs, e.g., www.webpage.com/image.jpg, the HTML document includes instructions or an identification of a file containing instructions regarding how to generate a dynamic URL. In this example, the HTML document includes instructions to generate a dynamic URL to retrieve an image. The instructions include a static portion of a URL, e.g., "www.webpage.com/empty.gif?rand=" and a command to the web browser to execute a random number generator function to append a random number to the static portion of the URL. Thus, to generate the dynamic URL, the web browser executes an available random number generation function, e.g., Math.random( ), which creates the random number 5489875869. The web browser then appends this random number to the static portion of the URL to create the dynamic URL: www.webpage.com/empty.gif?rand=5489875869. The web browser then issues this as a request for a web resource from the dynamic URL.

However, rather than issuing these various requests directly to the corresponding web server, the web browser sends them to a prefetcher, which maintains a cache of various web resources that have been previously retrieved. Upon receiving various URL requests, the prefetcher checks the cache to determine whether the requested web resources are available in the cache by matching the URL in the request with URLs for web resources within the cache. If a match is found, and the cached resource is not stale, the prefetcher responds to the request with the cached web resource. If a match is not found, the prefetcher issues a request for the web resource at the specified URL.

As a part of checking the cache, the prefetcher also examines the request to determine whether it can proactively request, i.e., prefetch, other URLs that may be later requested as a part of obtaining a requested web page. For example, when the prefetcher receives a request for www.webpage.com, its records indicate that the web resource located at www.webpage.com/background.jpg is usually subsequently requested, and so rather than waiting for a later request for www.webpage.com/background.jpg, the prefetcher proactively issues a request for www.webpage.com/background.jpg. However, for a dynamic URL generated using a random number generator, it is highly unlikely that the prefetcher will see the same dynamic URL requested twice, and thus it is both unlikely to attempt to prefetch a web resource at the dynamic URL, and it is also unlikely that it will find a match in its cache. Thus, the prefetcher cannot effectively prefetch the resource.

However, in many cases, dynamically-generated URLs reference web resources that are prefetchable, if the prefetcher were to know the formula for generating the dynamic URL. In other words, the value of the random number, in this example, does not affect the web resource that is requested, however, the number cannot be omitted from the URL or the content server will not correctly respond to the request, or may not respond at all. Instead, the random number may be used (e.g., by the web page developer) in an attempt to force a web browser to request a new copy of the web resource on every page visit.

To enable the prefetcher to prefetch dynamically-generated URLs, the web browser keeps track of dynamically-generated information during a web page transaction, as well as the method that was used to generate the dynamically-generated information. This tracked information, which may include any dynamic URLs generated (e.g., www.webpage.com/empty.gif?rand=5489875869), any dynamically-generated information (e.g. 5489875869), and the method used to generate the dynamically-generated information (e.g., Math.random( )), is referred to as "breadcrumbs" in this description. In this case, the web browser will save the breadcrumb information that is generated during the course of retrieving information for the initial request for www.webpage.com. Once all of the web resources to display the web page have been retrieved, the web browser will transmit the breadcrumb information to another server, called a hinting server.

The hinting server, after receiving the breadcrumb information, will attempt to derive the techniques used to generate each dynamically-generated URL. For example, the hinting server will determine a match between the number 5489875869 and the dynamically-generated URL www.webpage.com/empty.gif?rand=5489875869. It can then use the information that Math.random( ) was used to generate the number to create a hint template for the dynamically-generated URL, e.g., www.webpage.com/empty.gif?rand=[RANDOM]. It then associates the hint template with the originally-requested web page, www.webpage.com in this example.

At a later time, when another user (or the same user) attempts to retrieve the web page located at www.webpage.com, the other user's prefetcher may receive the request for www.webpage.com and issue a request for hint information to the hint server. The hint server then responds with the hint template, which the other user's prefetcher uses to dynamically-generate a URL to prefetch, and then cache the prefetched web resource.

Later in the same web transaction, when the web browser parses the HTML document received from www.webpage.com, it encounters the instructions to generate the dynamic URL. It generates the dynamic URL and transmits it to the prefetcher. However, because the dynamic URL generated by the web browser most likely includes a random number that is different than the random number generated by the prefetcher, the prefetcher does not immediately locate a match in its cache. However, as before, the web browser is collecting breadcrumbs for this new web page transaction. The prefetcher accesses the breadcrumb information for the current transaction and searches for a corresponding entry in the breadcrumbs for the dynamically-generated URL. Upon locating it, it is able to determine the static portion of the dynamically-generated URL and search its cache for a corresponding entry based on the received hint template. It then locates the web resource it prefetched based on the hint information and serves the web resource to the web browser, rather than issuing a request for the web resource at the dynamically-generated URL.

By extracting the breadcrumb information and generating templates for dynamically-generated URLs, a web browser, a prefetcher, and a hinting server may be able to speed the load time for requested web pages by effectively prefetching web resources, even those requested via dynamically-generated URLs.

This illustrative example is given to introduce the reader to the general subject matter discussed herein and the disclosure is not limited to this example. The following sections describe various additional non-limiting examples and examples of systems and methods for prefetching dynamic URLs.

Referring now to FIG. 1, FIG. 1 shows an example system for prefetching dynamic URLs. The system shown in FIG. 1 includes content server 160, hinting service 150, and computing device 110. The system also includes a network 140 (e.g. a public network such as the Internet, a private network, a combination of a public and private network, or the like) that allows for communication between the various components of the system 100. Although only one content server 160, one computing device 110, and one hinting service 150 are illustrated in FIG. 1 to avoid over complication of the drawing, the system 100 can include many more content servers 160, computing devices 110, or hinting services 150.

In this example, the computing device 110 executes a web browser 120, which includes a prefetcher 122 and a renderer 124, and maintains a cache 130 of web resources previously obtained by the web browser 110 or the prefetcher 122. The prefetcher 122 can receive or intercept requests for one or more web resources and determine whether the requested web resource is available in the cache 130. If so, the prefetcher 130 can respond to the request with the prefetched web resource from the cache 130. In addition, the prefetcher 130 can obtain hint information from the hinting service 150 to enable the prefetcher 130 to prefetch one or more web resources based on a request for a web page.

During operation, a user of the computing device 110 interacts with the web browser 120 to request web pages and other content from the content server 160 or other content servers. The web browser 120 issues various requests to the content server 160 for the content, which responds to the requests by sending the requested content to the web browser 120. The web browser provides the received content to the renderer 124, which renders the received information to display it on the computing device's display (not shown).

The web browser 120 also includes, or communicates with, a prefetcher 122 to prefetch objects associated with one or more URLS, including dynamic URLs, that are expected to be used during the rendering of the web page using the techniques described herein. The prefetched objects can be stored in cache 130 and then used to fulfill the requests for static and dynamic URLs issued by the web browser 120 during the rendering process. As described in more detail below, the prefetcher 122 obtains a dynamic hint template from the hinting service 150 corresponding to a dynamic URL that is expected to be requested during rendering of the web page. The prefetcher 122 then uses the dynamic hint template to prefetch an object prior to rendering that can be used to fulfill the request for the dynamic URL created during the rendering.

The hinting service 150 includes one or more computing devices and includes memory for storage of data and software applications, a processor for accessing data and executing applications, and components that facilitate communication over the network 140. In some examples, some or all of the functionality of the hinting service 150 can be implemented within the browser 120 or other applications executing on the computing device 110. In such a case, the dynamic hint templates may be generated, used, and stored locally on the computing device 110.

Figure 2:
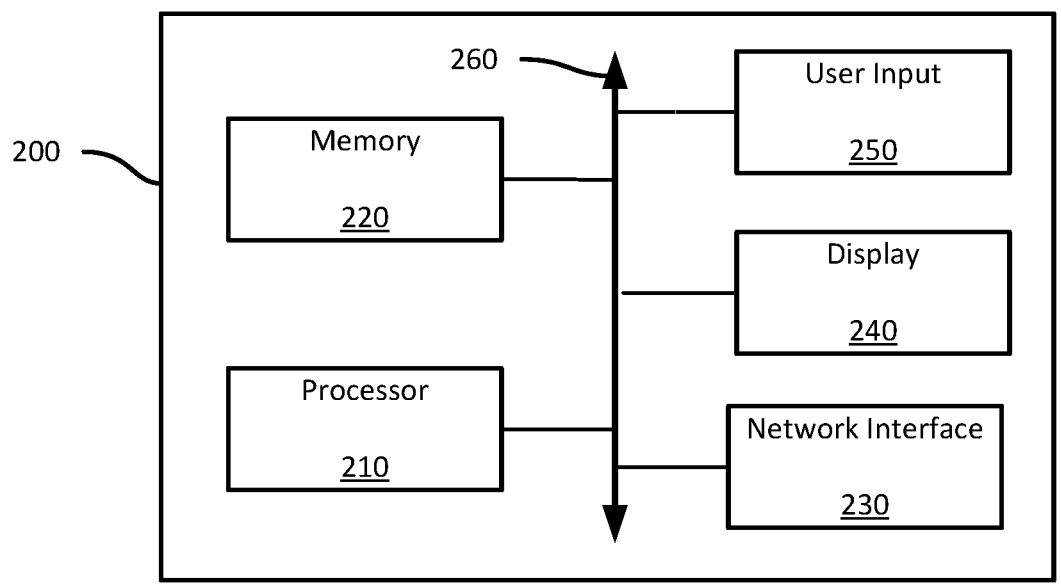
FIG. 2 shows an example computing device for prefetching dynamic URLs.

FIG. 2 shows an example computing device 200 suitable for prefetching dynamic URLs. The computing device 200 may be suitable for use as the computing device 110 of FIG. 1, but may also be suitable for use as a hinting service 150 or content server 160. The computing device 200 includes a processor 210, a memory 220, a network interface 230, a display 240, and one or more user input device 250. Each of these components is in communication with other components via one or more communications buses 260. Examples of suitable processors and memories are discussed later in this specification.

In this example, the computing device 200 is configured to execute a web browser 120 as described above with respect to FIG. 1. As discussed above, the web browser 120 includes both a prefetcher 122 and a renderer 124. When a user selects or enters a URL into the web browser 120 for desired content, the web browser 120 generates a request to transmit to content server 160 for the requested content. When the initial request for the URL is transmitted, it initiates a "transaction" that, assuming everything operates correctly, will ultimately result in the requested content being retrieved and presented to the user in the web browser. During the course of the transaction, the web browser may issue multiple requests for content and may receive, in response, multiple web resources in response to those requests.

For example, a request for the URL www.cnn.com results in an initial request being sent to a content server to request the web page at www.cnn.com. The response from the content server likely will be a file, e.g., an HTML file, that includes content as well as instructions to the web browser regarding how to display the content. In addition, the file will likely also include additional URLs embedded within it. These additional URLs identify additional content that needs to be retrieved and displayed as part of the www.cnn.com web page. For example, the additional content may be images, movies, audio, advertisements, etc. Some of the additional content may be hosted at the same content server as the www.cnn.com web page, while other of the additional content may be hosted elsewhere. However, the web browser will extract each of the URLs from the received HTML file and issue separate requests for each URL. Because these URLs are issued as a part of the process of retrieving the content of the www.cnn.com web page, they are referred to as occurring as a part of the same transaction. The initial request that creates a transaction is referred to as a "root" request, and requests the "root" object, e.g., the web page at www.cnn.com. Additional requests that result from the response to the root request are referred to as "child" requests, and are requests for "child" objects. Child objects are web resources that are a part of a root object, such as an image in a web page. Once all of the requests have been responded to (or have timed out, failed, etc.), the transaction is complete and the web page is displayed on the computing device's display 240. It should be understood, however, that the web page may also be partially displayed during the transaction as content is being retrieved.

Because a transaction may include multiple child requests, some or all of which may issue further child requests, a transaction may involve a large number of requests for web resources, and subsequent responses to those requests. Because the requests are typically transmitted from a client device, e.g., the computing device 110 of FIG. 1, to another server, e.g., content server 160, via an intervening network, e.g., the Internet or network 140, the total time to obtain the web resources for all of the requests and responses may be significant, which can negatively impact the user experience. Thus, prefetching may be employed to proactively request web resources that are needed for a particular web page before a web browser actually issues requests for those web resources. In many cases, the resources to be prefetched can be predetermined as they are represented by static URLs. The prefetched data is then cached on the client device, and when the web browser later issues a request for a particular URL that has been prefetched, the web browser is provided with the cached copy of the prefetched web resource, which can significantly improve web page load speed.

However, effectively prefetching some resources can be difficult. For example, some web pages include child objects referenced by dynamically-generated URLs. Thus, in some examples, the root object, or a child object, includes embedded instructions regarding how to generate one or more URLs that will be used to request various child objects.

Dynamically-generated URLs (or just "dynamic URLs") typically include a static portion, e.g., www.cnn.com/image, and one or more dynamic portions, typically a dynamically-generated numeric value or alphanumeric string. It should be appreciated, however, that a dynamically-generated URL may not include a static portion in some examples. The embedded instructions may include an identification of a function the client device must execute to generate the dynamic portion of the dynamic URL. Examples of suitable functions to generate one or more dynamic portions of a dynamic URL include a random number generator function, or a date or time function. In some examples, dynamically generated values may be transformed, such as by using a truncated portion of a random number, e.g., the last 5 digits of a random number. Some other examples include executing embedded scripts, e.g., JavaScript, that may generate an entire dynamic URL, or just a portion of a dynamic URL.

A dynamic URL may be difficult to prefetch because the prefetcher 122 may not know how to generate a dynamic URL. Or, after prefetching a web resources from a dynamic URL, a later request from the web browser 120 for the same web resource may have a different dynamic URL. For example, if a dynamic URL is generated, in part, by generating a random number, the prefetcher 122 will likely generate a dynamic URL using a different random number than the web browser 120. Thus, when the web browser 120 later issues its request for a dynamic URL, it will not be found in the cache 130 as the dynamic URL from the web browser 120 will not match anything in the cache 130.

To allow prefetching of dynamic URLs, the prefetcher 122 may instead request "hints" from the hinting service 150 for a particular root object. The hinting service 150 may then provide hint information that identifies URLs that are typically requested during a transaction resulting from a request for the root object. In some examples, the hint information includes a listing of URLs that are frequently requested as a part of a transaction for a particular root object. For example, a transaction resulting from a root request for www.cnn.com may frequently result in child requests for a variety of graphic images, e.g., logos, videos, or advertisements. Hint information for www.cnn.com may thus include URLs for each of these web resources. When the prefetcher 122 detects a root request for www.cnn.com, it may issue a hint request to the hint service 150 and receive, in response, the hint information. It may then prefetch web resources using the hint information, e.g., by issuing child requests for each of the URLs within the hint information before the web browser 120 itself issues the child requests.

In examples of hint information that include templates for dynamic URLs, the prefetcher may generate child requests using the templates. For example, FIG. 3 shows example hint information 300 that includes both static URLs 310a-c for child objects as well as templates 320a-b for generating dynamic URLs for child objects. After receiving the hint information, the prefetcher 122 checks the cache 130 to determine whether any of the child objects identified in the hint information are already cached. If any child objects are not resident in the cache 130, or are cached but stale, the prefetcher 122 generates and transmits requests for those child objects using the URLs within the hint information. For the static URLs 310a-c, the prefetcher 122 may simply issue the request for the web resource using the respective static URL. For the templates 320a-b, the prefetcher 122 generates a dynamic URL using a corresponding template 320a-b. For example, for template 320a, the prefetcher generates a dynamic URL by calling a random number generation function and concatenating the resulting random (or pseudo-random) number to the static portion of the URL, i.e., "http://www.advertisement.com/advert=" in this example. If the random number was 1234567, the resulting dynamic URL would be "http://www.advertisement.com/advert=1234567" and the prefetcher 122 would issue a request for the corresponding child object.

However, to generate hints for dynamic URLs, the hinting service 150 may need information about how one or more dynamic URLs is generated. In the example system 100 shown in FIG. 1, the renderer 124 generates information that can be sent to the hinting service 150 to analyze and use to generate hint information for dynamic URLs.

In this example, the renderer 124, for each child object it requests, stores information associated with the request. For example, the information may be only a URL for the child object if the URL is a static URL, or it may include other information, such as a timestamp corresponding to a time the request for the child object was requested. Other information may include whether the response to the request for the child object was served from the cache 130 or from a content server 160.

In addition to information about the URLs, the renderer 124 also tracks certain functions it calls and the results of those function calls. For example, the renderer 124 may store a record for each time it calls a random number generation function and the resulting random (or pseudo-random) number during the course of a transaction. Similarly, the renderer 124 may store a record for each time it calls a date or time function and the resulting date or time, respectively, during the course of the transaction. These records may be stored along with other information about the transaction, such as the root object, the child objects requested, whether one or more child objects were successfully prefetched, timing information (e.g., timestamps) associated with each requested root or child object, etc. This collected information about the transaction may be referred to as the transaction's breadcrumbs, or just as "breadcrumbs."

Breadcrumbs, in different examples, may include different types of information. For example, breadcrumbs for a dynamic URL may include a root or child URL, one or more dynamically-generated URLs, an indication of a method of generating dynamic information (e.g., random number generation, time or date information, etc.), or information (e.g., randomly-generated numbers, time information, date information, etc.) dynamically generated by the method. Other examples of breadcrumbs that indicate the method of generating the dynamic information include a pointer to a stack trace of the instructions (or a copy of the instructions themselves) executed by the renderer 124 to generate the dynamic information or one or more scripts (e.g., a JavaScript) executed by the renderer 124 to generate the dynamic information. In some examples, additional information may be included as well, such as prefetch hit information (e.g., cache hits, cache misses, etc.).

Figure 6:
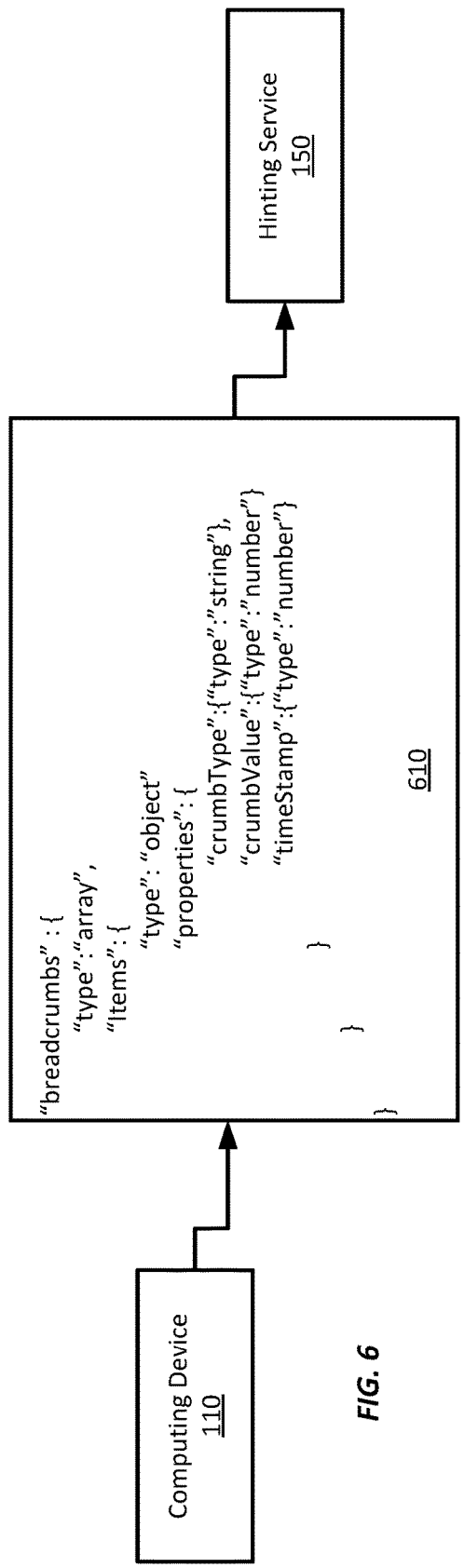

Referring to FIG. 4, FIG. 4 shows an example of breadcrumbs for different transactions. Each transaction is represented by a row in the table 400, and includes a root URL 400a-e, random numbers 420a-e generated during each transaction, date values 430a-e generated during each transaction, and URLs for child objects 440a-e from each transaction. In this example, the breadcrumbs from multiple transactions are illustrated in a single table for ease of reference, however, it should be appreciated that breadcrumbs may be stored or communicated in any suitable format, such as in JavaScript Object Notation (JSON). For example, FIG. 6 illustrates an example breadcrumb record 610 provided by a computing device 110 to a hinting service 150. The breadcrumb record 610 in this example shows a breadcrumb record having a "crumbType," which may have a value of "Random" or "Time," while the "crumbValue" record may have the dynamically-generated value, e.g., a random number or time. The "timeStamp" record may have a timestamp of the time the renderer 124 (or other portion of the web browser 120) called the function to generate the value. In short, a breadcrumb record can include any of the following to identify a method by which dynamic values for a dynamic URL were generated: an identification of one or more functions called to generate all or part of the dynamic value; a pointer to a stack trace of the instructions (or a copy of the instructions themselves) executed to generate all or part of the dynamic value; one or more scripts (e.g., one or more JavaScripts) executed by the prefetcher 122 to generate all or part of the dynamic value. It should be appreciated that in some examples, multiple such breadcrumb records may be included in a set of breadcrumb information for a web page transaction.

Breadcrumbs, in different examples, may be communicated on a per-transaction basis. For example, after each page load, the renderer 124 may immediately transmit the breadcrumbs from the transaction to the hinting service 150. In other examples, the renderer 124 may transmit breadcrumbs during the course of the transaction, or in batches periodically. In some examples, the renderer 124 may transmit breadcrumb information when a user closes a browser window or browser tab.

The hinting service 150 receives breadcrumb information for one or more transactions from the renderer 124 and parses the breadcrumbs to identify dynamic URLs and to generate templates for generating the dynamic URLs. Breadcrumb information may be received for each transaction initiated by a computing device 110. Further, as noted above, while the system 100 shown in FIG. 1 includes only one computing device 110, there may be many more computing devices each in communication with the hinting service 150 via the network 140. Thus, in some examples, the hinting service 150 may receive large amounts of breadcrumb information from a large number of different computing devices 110.

To generate templates, the hinting service 150 may first identify dynamically-generated URLs that may have been used to retrieve child objects. To do so, the hinting service 150 searches received breadcrumb information for URLs for child objects that the hinting service has not encountered previously, or has only encountered infrequently. These URLs may thus be referred to as "singletons" as they do not appear in multiple different transactions for the same root object. In contrast, static URLs may be seen each time a particular root object is requested. Singletons, in some examples, are candidate dynamic URLs because dynamic URLs generated using random numbers or time stamps are likely not to have been encountered before. And while pseudo-random numbers may occasionally repeat, such an occurrence is likely rare enough, particularly a repeated pseudo-random number in two different transactions for the same root object, as to not be of significant concern. However, singletons are not the only means of identifying candidate dynamic URLs. Other techniques include identifying characters or character strings typically associated with dynamically-generated information, e.g., "?," "rand=," "random=," "advert=," etc., and searching URLs for the occurrence of such characters or strings. If such a character or string is found within a URL, it may be flagged for further analysis as a potential dynamically-generated URL.

After identifying candidate dynamic URLs, the hinting service 150 may search the breadcrumb information for breadcrumbs that match portions of the candidate dynamic URLs. For example, random number breadcrumbs may be compared against the candidate dynamic URLs to determine whether the random numbers appear in any of the candidate dynamic URLs. If so, the hinting service 150 may generate a template for the candidate dynamic URL based on the URL and the random number. Referring to FIG. 4 again, a child URL 440a for the first root URL 410a includes a string of numbers following "cbuster=" that matches one of the date breadcrumbs. Thus, the hinting service 150 may infer that a template to dynamically-generate the URL for the URL 440a includes a static portion, e.g., "https://www.amazon.com/empty.gif?cbuster=" and a dynamic portion generated by calling a date or time function by a web browser's renderer. A resulting template for the URL 440a may be "https://www.amazon.com/empty.gif?cbuster=<DATE>." This inference may be reinforced by analysis of subsequent transactions that result in the same inferred template. For example, the transactions represented in the second and third rows of the table 400 in FIG. 4 also include URLs 440b-c that have a dynamic portion that matches a Date( ) breadcrumb. Thus each conforms to this same template and so the hinting services confidence that the template is accurate increases, e.g., by increasing a confidence score associated with the template.

Figure 5:
FIG. 5 shows an example of generating hints for dynamic URLs from breadcrumb information for prefetching dynamic URLs.

FIG. 5 illustrates the process of using breadcrumb information to generate templates, which may then be sent as hints. The breadcrumb information 400 is used by the hinting service 150 to generate templates 500 for dynamically generated URLs. When the hinting service 150 later receives hint requests for a root object, it may generate hint information 510-520 based on the determined templates and provide the hint information to a requesting web browser.

Figure 7:
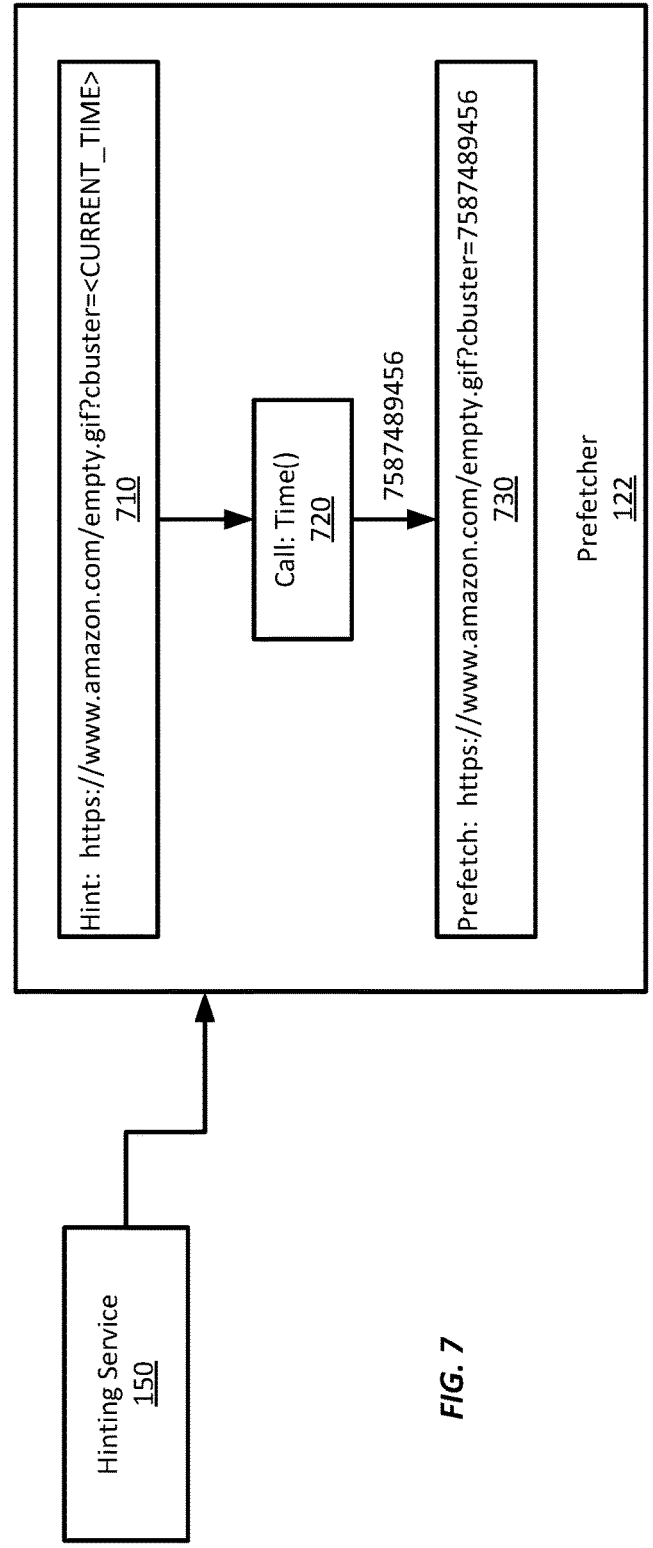

FIG. 7 shows an example diagram showing a prefetcher 122 generating a dynamic URL based on a template 710 received in a hint from a hinting service 150. The prefetcher receives the template 710, calls the specified function, e.g., Time( ) to obtain a dynamically-generated value, which is then inserted into the template to generate the dynamic URL 730 to prefetch.

To validate the hint information or the templates, a prefetcher, after requesting and receiving hint information, may then monitor cache hits and report cache hit information to the hinting service 150. Cache hits for dynamically-generated URLs for child objects for which hint information was sent may validate that a hint template generated by the hinting service 150 was correct, while cache misses may indicate that a template was inaccurate. Thus, over time, the hinting service 150 may augment or refine its hint information for dynamically-generated URLs.

Figure 8:
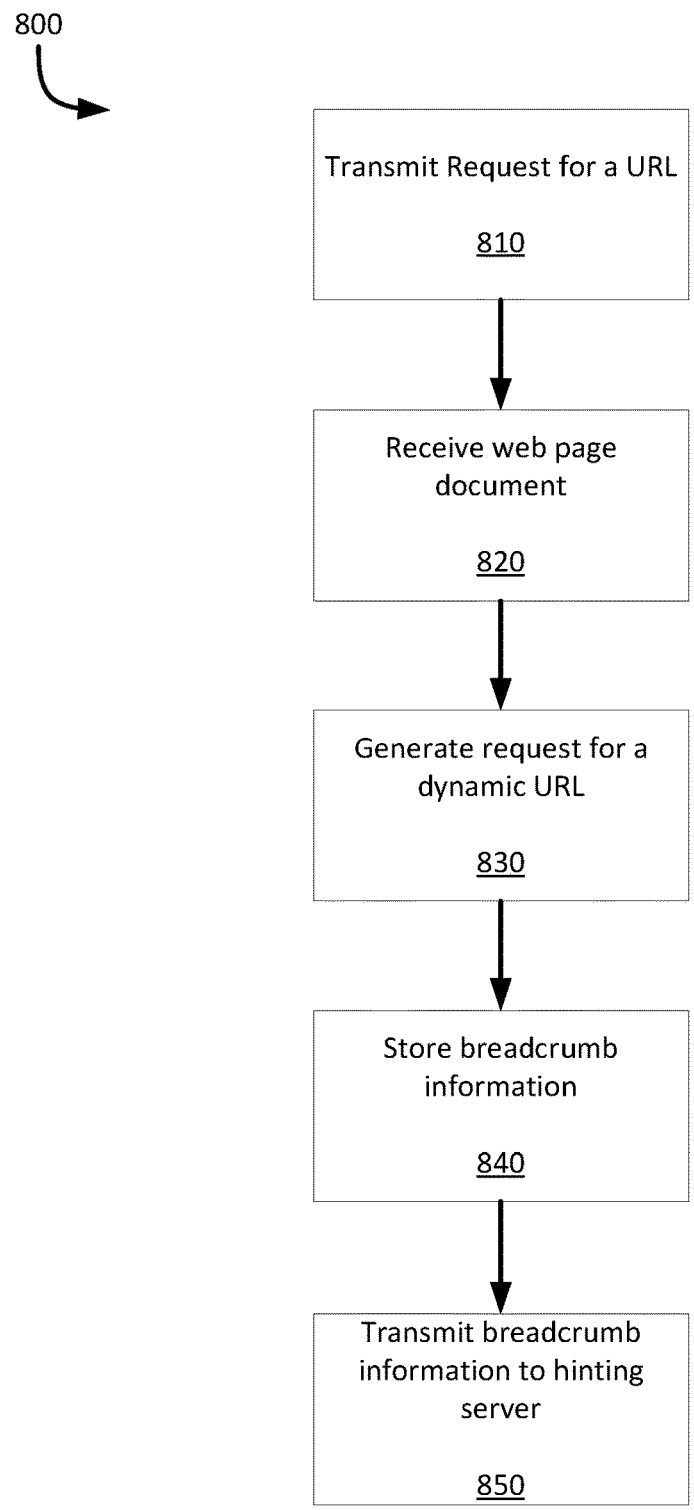
FIGS. 8-10 show example methods for prefetching dynamic URLs.

Referring now to FIG. 8, FIG. 8 illustrates an example method 800 by which a client computing device (e.g., a browser) gathers and transmits to a hinting service breadcrumbs associated with a web page transaction. The method 800 can be part of a larger method for prefetching dynamic URLs. The example method of FIG. 8 will be discussed with respect to the system 100 shown in FIG. 1, however, it is not limited to such a system 100. Instead, the example method may be performed by any suitable system or computing device according to this disclosure.

At block 810, the web browser 120 transmits a URL to a content server as a part of a web page transaction. In this example, the URL is a URL for a web page and is the root request for a new transaction. However, in some examples, the requested URL may be any requested URL within a transaction, such as a request for a child object that itself results in subsequent additional child URLs.

At block 820, the web browser 120 receives, as a part of the web page transaction, a web page document having one or more instructions to generate a dynamic URL for a child object. In this example, the web page document comprises instructions (e.g., JavaScript instructions) for generating a dynamic URL for a child object. The instructions include a static portion of the dynamic URL and an indication of the method of generating the dynamic portion of the dynamic URL, such as a function name or a function call. In other examples, the dynamic URL is described using other instructions, such as by scripts or calls to multiple functions.

While, in this example, the web page document only includes instructions to generate one dynamic URL, other web page documents may include instructions to generate more than one dynamic URL. Further, child objects obtained during the web page transaction may also include instructions to generate one or more dynamic URLs for further child objects.

At block 830, the web browser 120 generates a request for the dynamic URL based on the one or more instructions, the generating comprising generating a dynamic portion of the dynamic URL. In this example, the renderer 124 portion of the web browser 120 generates the request for the dynamic URL; however, in other examples, other aspects of the web browser 120 may generate the request for the dynamic URL. To generate the dynamic URL in this example, the renderer 124 executes the JavaScript in the received web page document, which calls a random number generation function, such as the Java function Math.Random( ) or a random number function provided by an operating system, such as rand( ) The random number generation function returns a value, which the JavaScript appends to a static portion of the dynamic URL. The JavaScript then provides the dynamic URL to the renderer 124, which issues a hypertext transfer protocol ("HTTP") request for the dynamic URL. And while random numbers are used in this example, dynamic URLs may be generated using any type of dynamically-generated information, including using date or time functions, or performing transformations on dynamically-generated values, such as by truncating such values. In some embodiments, the instructions for generating the dynamic URL can include a series of instructions that both generate an initial value (e.g., a random number, the current date or time, etc.) and then transform the initial value. Examples of such transforms include truncating, multiplying, adding to, and subtracting from the initial value.

It should be understood that issuing a request for a URL may involve additional steps, such as resolving a network address for the domain associated with the URL, establishing a network connection, e.g., a transmission control protocol (TCP) connection, with the computer associated with the resolved network address, and forming an appropriate HTTP-compliant request. Any or all of these, or other steps, may occur prior to, or as a part of, block 830 in different examples.

At block 840, the web browser 120 stores breadcrumb information regarding how the dynamic portion of the dynamic URL was generated (as part of block 830). The breadcrumb information stored at block 840 can include the value of the dynamic portion of the dynamic URL generated as part of block 830 and an indication of the method by which the dynamic portion was generated. In the example discussed above with respect to block 830, the renderer 124 generated the dynamic portion of the URL by calling a random number generation function and appending the returned random number to the static portion of the URL. Continuing with that example, at block 840, the renderer 124 stores in a breadcrumbs record an identifier (e.g., a character string or a predetermined value) identifying the random number generation function and the random number returned by the random number generation function. Thus, for example, the renderer 124 may store a record having two values: (1) the value returned by the random number generation function, and (2) the number 0x10, which indicates the value was generated using a random number generation function. The renderer 124 may use other values, e.g., 0x01, to indicate a date function was used, or 0x00 to indicate that a time function was used. Other values may be stored as well, in some examples. As also discussed above, the dynamic portion of the URL can be generated at block 830 by executing a series of instructions, which can include, for example, calling a particular function to generate an initial value and then applying a transform to the initial value. For example, as discussed above, a dynamic portion of a dynamic URL may be a truncated value, such as a truncated random number or a truncated time value. In one such example, the renderer 124 may store a record that indicates (1) the value returned by the function to generate the dynamic portion of the URL, (2) an indication of the function used to generate the dynamic portion of the URL, and (3) an identification of a function used to modify the value returned by the function to generate the dynamic portion of the URL. As yet another example and as also discussed above, the dynamic portion of the URL can be generated at block 830 by executing a series of instructions. In such an embodiment, at block 840, the renderer 124 stores in a breadcrumbs record a pointer to the instructions in a stack trace that were executed to generate the dynamic value. Alternatively, the renderer 124 stores a copy of the instructions themselves in the breadcrumbs record. In either of the foregoing, the pointer or the copy of the instructions comprises an identification of the method by which the dynamic portion of the URL was generated. As a further example and as also discussed above, the dynamic portion of the URL can be generated at block 830 by executing one or more scripts (e.g., JavaScripts). In such an embodiment, at block 840, the renderer 124 stores in a breadcrumbs record an identification or copy of the script(s). In this embodiment, the identification or copy of the script(s) comprises an identification of the method by which the dynamic portion of the URL was generated. Still further variations are within the scope of this disclosure.

Methods performed by the renderer 124 to generate a dynamic URL can include examining the values passed to URL setting functions in Javascript (e.g., SetSrc, XmlHttpRequest, or SetInnerHtml) to obtain the dynamically generated URL in the Javascript stack context within which that URL is constructed. This context can be captured by crawling the entire stack (including file, function and line number of each frame) that resulted in the call to the URL setting function. This stack context can be sent along with the setting function and the dynamic URL to the hinting service 150. This information can then be combined with the rand/Date breadcrumb values, which also contain stack context information, generated at the approximately the same time to better determine the relationship between the breadcrumb values and the dynamic portion of the dynamic URL.

In some examples, more than one dynamic URL may be generated during the course of a web page transaction. In some such examples, if multiple dynamic URLs are generated during the course of the web page transaction, the renderer 124 may store the dynamic portion of the dynamic URL and an indication of a method of generating the dynamic portion of the dynamic URL for each dynamically-generated URL. Though in some examples, the renderer 124 may only store such information for the root object, or immediate child objects of the root object. However, further variations are encompassed within the scope of this disclosure.

Further, other information about a transaction may be stored. For example, such information may include information to help the hinting service 150 validate one or more templates for dynamic URLs. For example, the prefetcher 122 may store information indicating whether or not prefetched web resources retrieved from a dynamic URL during a transaction resulted in a cache hit during that transaction. Such information may be provided to a hinting service 150 to help the hinting service 150 validate or modify one or more templates for generating dynamic URLs.

At block 850, the web browser 120 transmits the breadcrumb information to the hinting server 150. As noted, the breadcrumb information includes both the value and the method used to generate the value of the dynamic portion of the URL. As also noted, the breadcrumb information can include additional information such as the parent (e.g., root) URL, the dynamic URL itself, and information regarding cache hits and misses. In some embodiments, the dynamic URLs are instead provided to the hinting service 150 with other URLs (e.g., static URLs) that were part of the web transaction. In this example, the renderer 124, at the conclusion of the web page transaction, creates breadcrumb information that includes the URL for the root object that initiated the web page transaction, the dynamic URLs generated during the web page transaction, the dynamically-generated values, and the indications of the methods used to generate the dynamically generated values.

Referring again to FIG. 4, the renderer 124 may generate breadcrumb information for, e.g., a web page transaction initiated by a root object at http://www.amazon.com (corresponding to the first row of the table shown in FIG. 4). During the course of the web page transaction, the renderer 124 stores the Math.Random( ) values 420a, the Date( ) values 430a, and indications of the methods used to generate the respective values. The renderer 124 may then transmit the URL for the root object 410a, the Math.Random( ) and Date( ) values 420a, 430a, and the dynamic URLs 440a generated during the web transaction to the hinting service 150 within a JSON object.

The example method 800 shown in FIG. 8 is described above with respect to a simple web page transaction having a root object that includes only a single request for a dynamic URL. However it should be appreciated, as discussed above, that multiple dynamic URLs may be generated for a single root object, or for one or more child objects. Thus, the method 800 of FIG. 8, or portions of the method 800, may execute multiple times during the course of a single web transaction. And still further variations of the method 800 are contemplated and within the scope of this disclosure.

Figure 9:
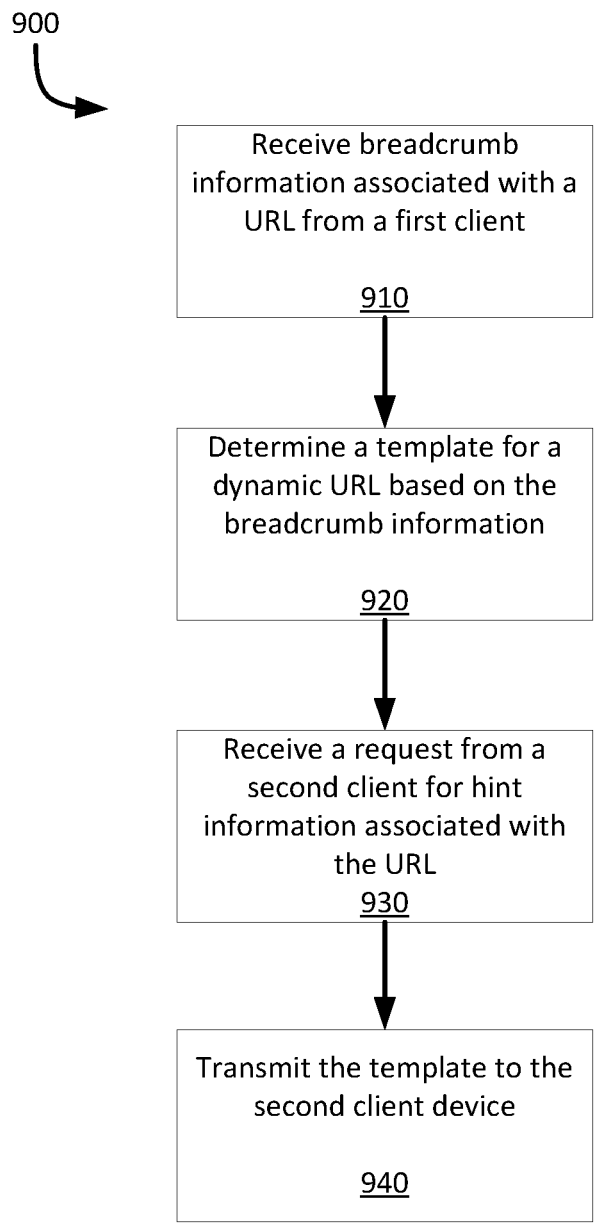

Referring now to FIG. 9, FIG. 9 illustrates an example method 900 by which a template for generating a dynamic URL is created from breadcrumbs. The method 900 can be part of a larger method for prefetching dynamic URLs. The example method of FIG. 9 will be discussed with respect to the system 100 shown in FIG. 1, however, it is not limited to such a system 100. Instead, the example method may be performed by any suitable system or computing device according to this disclosure. Further, while the method is described as being performed at the hinting service 150 in the following description, it may instead be performed at any suitable computing device. For example, the computing device 110 itself may perform the method 900 of FIG. 9.

At block 910, the hinting service 150 receives breadcrumb information from a client device, the breadcrumb information comprising a URL, a dynamic URL, a dynamically-generated value, and an indication of a method of generating the dynamically-generated value. In this example, the hinting service 150 receives the breadcrumb information from the client device 110 as sent via the network 140 at block 850 of FIG. 8. However, it should be appreciated that the hinting service 150 may receive similar breadcrumb information from any number of client devices via the network 140 or any other network in communication with the hinting service. Regardless of the source, the breadcrumb information can include any of the types of breadcrumb information discussed above. For example, the breadcrumb information can include any of the types of breadcrumb information discussed above with respect to block 840 of FIG. 8. As also noted above, dynamic URLs generated at block 830 of FIG. 8 can be included in the breadcrumb information or can be provided to the hinting service in a list of child URLs encountered during the web transaction, which can include static and dynamic URLs. The dynamic URL for which a template is created in FIG. 9 can thus be received with the breadcrumb information at block 910, in a list of other URLs, or otherwise.

At block 920, the hinting service 150 determines a template for the dynamic URL based on breadcrumb information received at block 910 and/or from other client computing devices. In this example, the hinting service 150, for a dynamic URL identified in received breadcrumb information, searches the breadcrumb information for dynamically-generated values that match a portion of the dynamic URL.

For example, referring again to FIG. 4, the hinting service 150 searches the Math.Random( ) values 420a and Date( ) values 430a in the breadcrumb information for matches to a portion of the dynamically-generated URL 440a. In this example, the hinting service searches the dynamic URL for a string of digits and extracts the digits and stores the corresponding value into a buffer. It then, for each Math.Random( ) value and Date( ) value, until a match is found or no values remain, compares the respective value against the value stored in the buffer. If a match is found, the hinting service 150 determines that the dynamic URL was generated using a random number. In addition, the hinting service 150 determines that the portions of the dynamic URL that do not correspond to the string of digits are the static portions of the dynamic URL, while the portion(s) of the dynamic URL corresponding to the string of digits should be designated a dynamic field. The hinting service 150 may then identify the type of dynamic field, e.g., "RANDOM," and generate a template using the static portion, the dynamic field, and the type of dynamic field.

The foregoing examples of the hinting service 150 produce a template for a dynamic URL by directly matching the dynamic value portion of the dynamic URL with a value produced by a function call. In other examples, the hinting service 150 may be configured to indirectly match the dynamic value portion of the dynamic URL with a value produced by a function call. In such examples, the value returned by the function call may have been transformed in accordance with one or more transforms before being appended to the dynamic URL. The following describes such an example in which it is assumed that the dynamic value of a dynamic URL generated by the renderer 124 at block 830 of FIG. 8 was generated by calling a function a random number function (e.g., Math.Random( )) to produce 1563391635703477 and then applying a truncating transform (e.g., leaving only the first eight digits) to produce 15633916 and then multiplying the foregoing truncated result by two to produce 31267832. In this example, the resulting dynamic URL produced by the renderer 124 at block 830 of FIG. 8 was www.amazon.com/img.png?cb=31267832, and the breadcrumbs stored at block 840 and transmitted to the hinting service 150 at block 850 include that a call to the Math.Random( ) function returned 1563391635703477. To produce a template for the foregoing dynamic URL, the hinting service 150 at block 920 of FIG. 9 can do the following. After identifying www.amazon.com/img.png?cb=31267832 as a candidate dynamic URL, the hinting service 150 can identify the static portion of the URL (i.e., www.amazon.com/img.png?cb=) by any technique discussed herein for identifying the static portion of a dynamic URL. The hinting service 150 can then repeatedly apply combinations of known transforms to breadcrumb values received at block 910 and identify which matches the dynamic value 31267832. (This example assumes that the hinting service 150 has a list of all known transforms a renderer 124 in a client computing device 110 might have applied to a value returned by a function call before appending the returned and now transformed value to the static portion of the dynamic URL.) In this example, as the hinting service 150 repeatedly applies combinations of known transforms to the dynamic value 1563391635703477 among the breadcrumbs, it will eventually apply a combination of an eight first-digit truncating transform followed by a times-two multiplication transform to the breadcrumb value 1563391635703477 associated with the Math.Random( ) function and match the result to the dynamic value portion 31267832 of the dynamic URL. In this example, the hinting service 150 then generates a template at block 920 by replacing the dynamic value (31267832) with an indication of the method by which the dynamic value was generated, which in this example is Math.Random( ) followed by a truncation transform to the first eight digits followed by a multiplication transform by two. The resulting template is thus www.amazon.com/img.png?cb=<MATH.RANDOM( )><TRUNC_F8><MULT_2>.

Referring again to FIG. 5, other example templates 505*a-e* are illustrated that include static portions and dynamic fields, which are indicated by angle brackets, e.g., '<' and '>'. In these examples, two different types of dynamic fields are used, <RAND> and <CURRENT_TIME>, which correspond to random (or pseudo-random) numbers and a current time as returned by a date( ) or time( ) function. Still other types of fields may be specified. For example, as discussed above, some dynamically-generated values may be truncated. An example field type may thus be <RAND_TRUNC_F3> or <RAND_TRUNC_L5>, which indicate a random number that has been truncated to only include the first three digits or the last five digits, respectively.

In some examples, other techniques for determining a template may be employed. For example, rather than analyzing breadcrumb information from a single transaction, breadcrumb information from multiple transactions for the same root object, e.g., www.amazon.com, may be aggregated. After receiving breadcrumb information for a minimum number of transactions, the hinting service may then search the breadcrumb information for URLs that are substantially similar to each other, except for one or a small number of fields, or for URLs that are singletons. For example, breadcrumb information for www.amazon.com web page transactions may include URLs that all have the same initial portion, e.g., https://www.amazon.com/empty-.gif?cbuster=, but differ by a numeric field. In some examples, these different URLs may be singletons, though if the dynamic portion is relatively short, the odds that one or more of the URLs has been encountered in the past increases.

To identify dynamic URLs, the hinting service may search the child object URLs for any that are not already known to the hinting service 150. These unknown child object URLs may then be further searched to determine whether the child object URLs have identical matches within the breadcrumb information, e.g., the child object URLs appear in the same form in multiple different transactions for the same root object. If so, these child object URLs, while new to the hinting service 150, are likely not dynamically generated. Any remaining child object URLs are then most likely dynamic URLs.

After identifying dynamic URLs, the hinting service 150 can compare the dynamic URLs to other dynamic URLs, e.g., the hinting service 150 can compare singletons to each other, to determine a level of similarity. For example, dynamic URLs can be compared as character strings for any portion of the singleton preceding one or more predetermined characters that are likely to precede a dynamic field, such as '?' or '='. If a portion of one dynamic URL matches to the same portion of another dynamic URL, the hinting service 150 may determine that the compared portions represent a static portion of a template for a dynamic URL. The hinting service 150 may then extract the portions of these singletons that follow the predetermined characters and search for dynamically-generated values in the breadcrumb information that match these extracted portions. If matches are found for each, and are of the same type of dynamically-generated value (e.g., they are both random values), the hinting service 150 may determine a template based on the determined static portion and the identified type of dynamically-generated value.

Some examples may further apply confidence scores to one or more generated templates. For example, after generating the template, the hinting service 150 may generate a confidence score based on the number of singletons that apparently conformed to the same template. For example, if two singletons apparently matched and were generated according to the same template, the hinting service 150 may generate a confidence score of 50% for the template. However, if twenty singletons all apparently matched the same template, the hinting service may generate a confidence score of 90% for the template. The hinting service 150 then associates the template with the root object of the web page transaction.

Still further techniques for identifying candidate dynamically-generated URLs and determining a template for such a dynamically-generated URL are within the scope of this disclosure.

At block 930, the hinting service 150 receives a request for a hint for the URL, such as from a computing device 110. As noted, there can be many computing devices 110 connected to the network 140, and the computing device 110 from which the request is received at block 930 can be the same or a different computing device 110 than the one from which the breadcrumbs were received at block 910. Regardless, a user of the computing device 110 may select a URL in the web browser 120, which then issues a request for the corresponding web resource. The prefetcher 122 may receive or intercept the request and transmit a request for hints to the hinting service 150. In some examples, the hint request may be for either a root object or a child object. Further, in some examples, the hinting service 150 may receive multiple hint requests for a single transaction.

At block 940, the hinting service 150, in response to receiving the request for the hint, transmits the template for the dynamic URL to the requesting device. In this example, the hinting service 150 identifies one or more templates associated with the URL identified in the hint request and transmits hint information to the requesting device including the one or more templates.

However, in some examples, such as described above, the hinting service 150 may only provide templates in response to a hint request if the template has a confidence score above a predetermined threshold. For example, the hint request may specify a minimum confidence level, or the hinting service 150 may establish its own minimum confidence level. In some examples, the hinting service may provide each template associated with the identified URL, and may also provide confidence level information to the requesting device, which may be used by the requesting device to determine whether to use one or more of the templates or to determine the type of breadcrumb information to provide to the hinting service 150. For example, a requesting device may track cache hit information for dynamic URLs generated from templates below a threshold confidence value and provide such information in subsequent breadcrumb information.

It should be understood that the method 900 of FIG. 9, or portions of the method 900, may be performed repeatedly. For example, the hinting service 150, or another computing device, may determine multiple templates at block 920, or perform block 920 multiple times based on breadcrumb information for different web transactions. Further, the hinting service 150 may receive multiple requests for hint information and respond to one or more with hinting information, including one or more templates. And still further variations of the method 900 are contemplated and within the scope of this disclosure.

Figure 10:
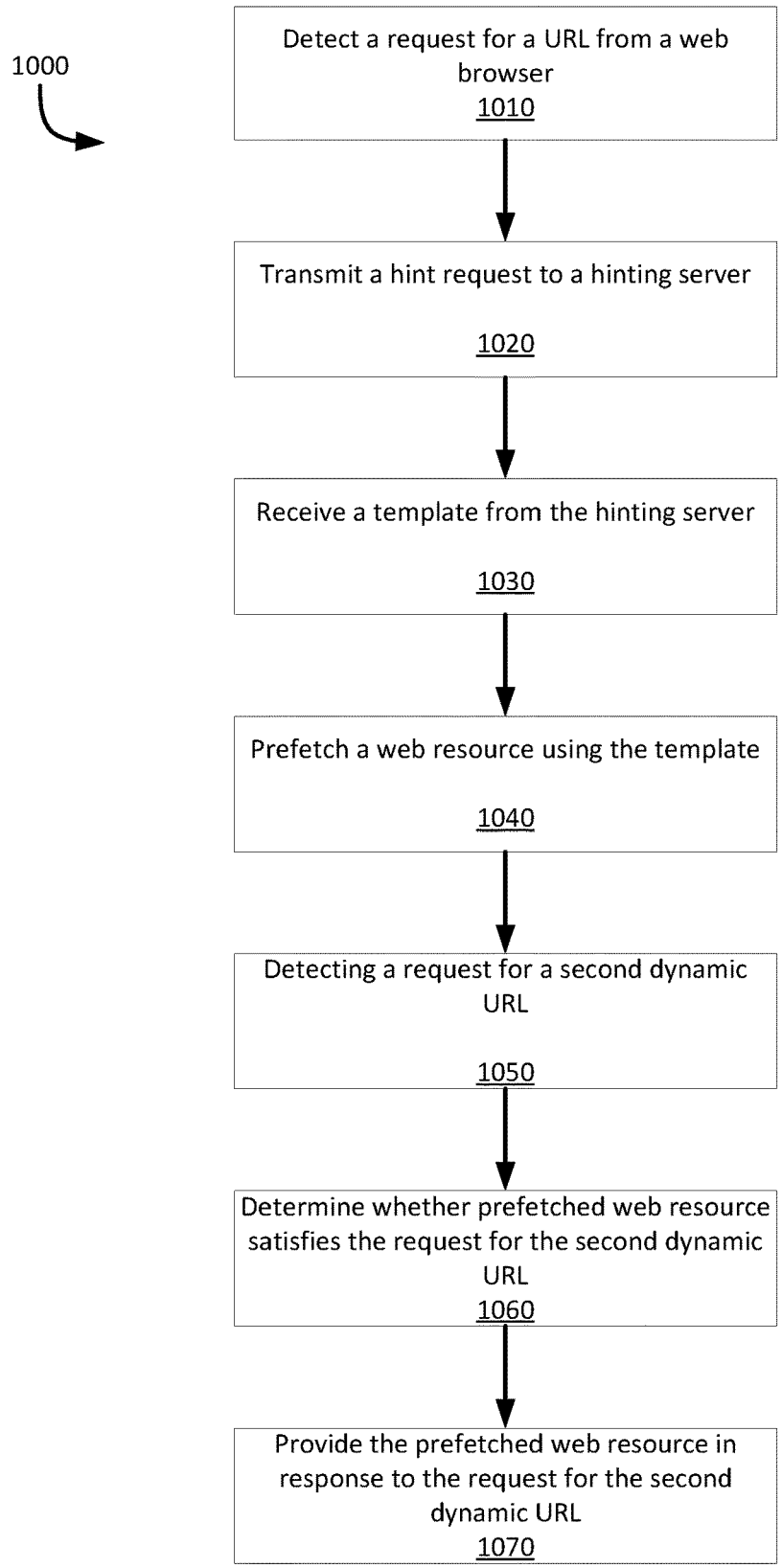

Referring now to FIG. 10, FIG. 10 shows an example method 1000 by which a computing device utilizes a template received from a hinting service for prefetching dynamic URLs. The example method 1000 of FIG. 10 will be discussed with respect to the system 100 shown in FIG. 1, however, it is not limited to such a system 100. Instead, the example method may be performed by any suitable system or computing device according to this disclosure.

At block 1010, the prefetcher 122 detects a request comprising a URL (e.g., a URL such as a root URL that results in additional child URLs) from a web browser as a part of a web page transaction with a content server. (Hereinafter, the URL received at block 1010 is sometimes referred to as a root URL for ease of discussion, but it is understood that the URL can instead be any parent URL that results in child URLs.) In one example, the prefetcher 122 observes requests generated or transmitted by the web browser 120 or a component of the web browser 120, such as the renderer 124, and identifies a URL within the request. However, in some examples, the web browser 120 or the renderer 124 may transmit the request to the prefetcher 122, or may instruct the prefetcher 122 to issue the request.

At block 1020, the prefetcher 122 transmits a hint request to a hinting service 150 for the URL detected at block 1010. In this example, the prefetcher 122 first determines whether the URL is a root request for a new web page transaction and, if so, transmits a hint request to the hinting service for the root URL. In some embodiments, if the URL is not a root request, the prefetcher 122 does not transmit the hint request. However, in other embodiments, the prefetcher 122 may issue hint requests as long as the URL is a parent URL that results in child URLs.

At block 1030, the prefetcher 122 receives, from the hinting server, a response to the hint request, the response comprising at least one template for a dynamic URL expected to be encountered while processing the object (e.g., a web page) referenced by the root URL (which as noted, can be a root URL). In this example, the response comprises the template as well as other hint information for processing (e.g., rendering) the object referenced by the root URL. However, in some examples, a response from the hinting service 150 may only include a template for the expected dynamic URL. Regardless, the template can be a template generated by the hinting service as described above with respect to block 920 of FIG. 9. The template can thus comprise any of the information discussed above with respect to block 920.

At block 1040, the prefetcher 122 generates the expected dynamic URL based on the template and prefetches a web resource using the dynamic URL as a part of the web page transaction. (Hereinafter the generated dynamic URL is referred to as a "first dynamic URL.") In this example, after receiving the response to the hint request, the prefetcher 122 generates the first dynamic URL based on the template. For example, the template may include a static portion of the first dynamic URL as well as an indication of a method for generating a dynamic portion of the first dynamic URL, such as a random number generation function or a time or date function. The prefetcher 122 performs the indicated method, such as by calling a function associated with the indicated method (e.g., rand( ) time( ) or date( ) to obtain a dynamic portion of the first dynamic URL. In some examples, as discussed above, the dynamic portion of the first dynamic URL may be modified in some way, such as by truncating the value returned by the indicated method. The prefetcher may then combine, e.g., by concatenating, the static portion and the dynamic portion to generate the first dynamic URL. The prefetcher 122 may then issue a request for a web resource using the first dynamic URL. In response to the request, the prefetcher 122 may receive the requested web resource and store the prefetched object referenced by the first dynamic URL as well as the first dynamic URL itself in the cache 130.

At block 1050, the prefetcher 122 detects a second request for a dynamic URL (hereinafter referred to as a "second dynamic URL"). The second dynamic URL can be a dynamic URL generated by the renderer 124 from instructions or a reference to instructions within an object returned (e.g., by a web server) in response to the root URL (e.g., the URL that was detected at block 1010) for generating the second dynamic URL.

At block 1060, the prefetcher 122 determines whether the prefetched object (prefetched and cached at block 1050 using the first dynamic URL) fulfills the request for the second URL. In this example, the prefetcher 122 determines whether the second dynamic URL sufficiently matches the first dynamic URL (or the template received from the hint service 150 from which the first dynamic URL was generated). For example, the prefetcher 122 may compare the second dynamic URL against the static portion of the first dynamic URL (or the template from which the first dynamic URL was generated) to determine whether there is a match. If there is a match, the prefetcher 122 may conclude that the first dynamic URL sufficiently matches the second dynamic URL and fulfill the request for the object referenced by the second dynamic URL with the cached object prefetched at block 1040 using the first dynamic URL. Alternatively, the prefetcher can take further steps to verify that the second dynamic URL matches the first dynamic URL. For example, the prefetcher 122 can determine whether a remaining portion of the second dynamic URL matches any breadcrumb information generated during the course of the current transaction. For example, the prefetcher 122 may access breadcrumb information generated by the renderer 124 for the then-current transaction including breadcrumb information from generating the second dynamic URL and search for dynamically-generated values that match the remaining portion of the second dynamic URL. If a matching dynamically-generated value is identified, the prefetcher 122 may then take further steps to verify that the second dynamic URL matches the first dynamic URL by, for example, determining whether a corresponding method used to generate the dynamically-generated value of the second dynamic URL matches the method for generating the dynamically-generated value of the first dynamic URL as identified, for example, within the template. In this example, only if one, more than one, or all of these further checks indicate a match does the prefetcher 122 conclude that the second dynamic URL sufficiently matches the first dynamic URL or the template from which the first dynamic URL was generated. Regardless, the prefetcher 122 may then locate in the cache the web resource prefetched at block 1040. In some examples, the prefetched web resource may not have been received, or may be indicated as stale, though in some examples, the prefetched web resource may exist within the cache and be identified by the prefetcher 122 as fulfilling the request for the second dynamic URL.

At block 1070, in response to determining that the prefetched web resource fulfills the request for the second dynamic URL, the prefetcher 122 provides the object prefetched at block 1040 utilizing the first dynamic URL to the web browser 120. The prefetcher 122 can does so rather than send the second dynamic URL to a content server as a request for the web resource referenced by the second dynamic URL. The prefetcher 122 can thus discard the second dynamic URL.

The example method 1000 shown in FIG. 10 is described above with respect to a simple web page transaction having a root object that includes only a single request for a dynamic URL. However it should be appreciated, as discussed above, that multiple dynamic URLs may be generated for a single root object, or for one or more child objects. Thus, the method 1000 of FIG. 10, or portions of the method 1000, may execute multiple times during the course of a single web transaction. For example, the prefetcher 122 may prefetch multiple web resources using dynamically-generated URLs and store the received web resources in the cache, and then, in response to subsequent requests for web resources, determine whether the cached web resources fulfill one or more of the requests, and, if so, provide the responsive cached resources. And still further variations of the method 800 are contemplated and within the scope of this disclosure.

While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

This illustrative example is given to introduce the reader to the general subject matter discussed herein and the disclosure is not limited to this example. The following sections describe various additional non-limiting examples and examples of systems and methods for prefetching dynamic URLs.

That which is claimed is:

1. A method comprising:
   storing breadcrumb information comprising:
   identifications of generating methods for generating dynamic values, wherein the generating methods in the breadcrumb information each correspond to a different function, and
   for each of the generating methods, at least one dynamic value generated by the generating method, wherein each of the dynamic values in the breadcrumb information is a value returned by a call to one of the functions;
   receiving a dynamic URL from a first client device, the dynamic URL comprising a first dynamically-generated value;
   determining a template for generating the dynamic URL based on the first dynamically-generated value and the breadcrumb information, wherein the determining a template comprises:
   identifying a static portion of the dynamic URL, and
   matching the dynamically-generated value of the dynamic URL with a value or a transformation of a value in the breadcrumb information returned by one of the functions,
   wherein the template comprises the identified static portion and the one of the functions; and
   transmitting the template to a second client device in response to a request for hinting information corresponding to the dynamic URL.

2. The method of claim 1, wherein the determining a template comprises:
   finding in the dynamic URL a static portion, and
   identifying one of the generating methods in the breadcrumb information that corresponds to a method that generated the first dynamically-generated value of the dynamic URL,
   the template comprising the static portion and an identification of the one of the generating methods.

3. The method of claim 1, wherein the breadcrumb information further comprises cache hit information associated with one or more templates, the method further comprising validating at least one template based on the cache hit information.

4. The method of claim 1, wherein the first client device and the second client device are different client devices.

5. The method of claim 1, wherein the determining a template comprises:
   matching the dynamically-generated value of the dynamic URL with one of the dynamic values in the breadcrumbs, and
   identifying one of the generating methods in the breadcrumbs that generated the matching dynamic value.

6. The method of claim 5, wherein the template comprises a static portion of the dynamic URL and the identified generating method.

7. The method of claim 1, wherein the determining a template further comprises:
   identifying a transform that, when applied to one of the values in the breadcrumb information, results in the transformed value that matches the dynamically-generated value of the dynamic URL,
   wherein the template comprises the identified static portion, a function that corresponds to the one of the values in the breadcrumb information, and the identified transform.

8. The method of claim 1, wherein the determining a template further comprises:
   identifying a sequence of transforms that, when applied to one of the values in the breadcrumb information, results in the transformed value that matches the dynamically-generated value of the dynamic URL,
   wherein the template comprises the identified static portion, a function that corresponds to the one of the values in the breadcrumb information, and the identified sequence of transforms.

9. A device comprising:
   a storage device in which breadcrumb information is stored comprising:
   identifications of generating methods for generating dynamic values, wherein the generating methods in the breadcrumb information each correspond to a different function, and
   for each of the generating methods, at least one dynamic value generated by the generating method, wherein each of the dynamic values in the breadcrumb information is a value returned by a call to one of the functions; and
   a processor configured to execute processor-executable program code stored in a memory, the processor-executable program code configured to cause the processor to:
   receive a dynamic URL from a first client device, the dynamic URL comprising a first dynamically-generated value;
   determine a template for generating the dynamic URL based on the first dynamically-generated value and the breadcrumb information, wherein the processor-executable program code configured to cause the processor to determine a template comprises processor-executable program code configured to cause the processor to:
   identify a static portion of the dynamic URL, and
   match the dynamically-generated value of the dynamic URL with a value or a transformation of a value in the breadcrumb information returned by one of the functions,
   wherein the template comprises the identified static portion and the one of the functions; and
   transmit the template to a second client device in response to a request for hinting information corresponding to the dynamic URL.

10. The device of claim 9, wherein the processor-executable program code is further configured to cause the processor to:
    find in the dynamic URL a static portion, and
    identify one of the generating methods in the breadcrumb information that corresponds to a method that generated the first dynamically-generated value of the dynamic URL,
    the template comprising the static portion and an identification of the one of the generating methods.

11. The device of claim 9, wherein the breadcrumb information further comprises cache hit information associated with one or more templates, wherein the processor-executable program code is further configured to cause the processor to validate at least one template based on the cache hit information.

12. The device of claim 9, wherein the first client device and the second client device are different client devices.

13. The device of claim 9, wherein the processor-executable program code is further configured to cause the processor to:
  match the dynamically-generated value of the dynamic URL with one of the dynamic values in the breadcrumbs, and
  identify one of the generating methods in the breadcrumbs that generated the matching dynamic value.

14. The device of claim 13, wherein the template comprises a static portion of the dynamic URL and the identified generating method.

15. The device of claim 9, wherein the processor-executable program code is further configured to cause the processor to:
  identify a transform that, when applied to one of the values in the breadcrumb information, results in the transformed value that matches the dynamically-generated value of the dynamic URL,
  wherein the template comprises the identified static portion, a function that corresponds to the one of the values in the breadcrumb information, and the identified transform.

16. The device of claim 9, wherein the processor-executable program code is further configured to cause the processor to:
  identify a sequence of transforms that, when applied to one of the values in the breadcrumb information, results in the transformed value that matches the dynamically-generated value of the dynamic URL,
  wherein the template comprises the identified static portion, a function that corresponds to the one of the values in the breadcrumb information, and the identified sequence of transforms.

17. A non-transitory computer-readable medium comprising processor-executable program code to cause a processor to:
  receive a dynamic URL from a first client device, the dynamic URL comprising a first dynamically-generated value;
  determine a template for generating the dynamic URL based on the first dynamically-generated value and breadcrumb information comprising identifications of generating methods for generating dynamic values, wherein the generating methods in the breadcrumb information each correspond to a different function, and for each of the generating methods, at least one dynamic value generated by the generating method,
wherein each of the dynamic values in the breadcrumb information is a value returned by a call to one of the functions, wherein the processor-executable program code to cause a processor to determine the template comprises processor-executable program code to cause the processor to:
  identify a static portion of the dynamic URL, and
  match the dynamically-generated value of the dynamic URL with a value in the breadcrumb information returned by one of the functions, and
  wherein the template comprises the identified static portion and the one of the functions; and
  transmit the template to a second client device in response to a request for hinting information corresponding to the dynamic URL.

18. The computer-readable medium of claim 17, wherein the processor-executable program code is further configured to cause the processor to:
  find in the dynamic URL a static portion, and
  identify one of the generating methods in the breadcrumb information that corresponds to a method that generated the first dynamically-generated value of the dynamic URL,
  the template comprising the static portion and an identification of the one of the generating methods.

19. The computer-readable medium of claim 17, wherein the breadcrumb information further comprises cache hit information associated with one or more templates, the method further comprising validating at least one template based on the cache hit information.

20. The computer-readable medium of claim 17, wherein the first client device and the second client device are different client devices.

21. The computer-readable medium of claim 17, wherein the processor-executable program code is further configured to cause the processor to:
  match the dynamically-generated value of the dynamic URL with one of the dynamic values in the breadcrumbs, and
  identify one of the generating methods in the breadcrumbs that generated the matching dynamic value.

22. The computer-readable medium of claim 21, wherein the template comprises a static portion of the dynamic URL and the identified generating method.

23. The computer-readable medium of claim 17, wherein the processor-executable program code is further configured to cause the processor to:
  identify a transform that, when applied to one of the values in the breadcrumb information, results in the transformed value that matches the dynamically-generated value of the dynamic URL,
  wherein the template comprises the identified static portion, a function that corresponds to the one of the values in the breadcrumb information, and the identified transform.

24. The computer-readable medium of claim 17, wherein the processor-executable program code is further configured to cause the processor to:
  identify a sequence of transforms that, when applied to one of the values in the breadcrumb information, results in the transformed value that matches the dynamically-generated value of the dynamic URL,
  wherein the template comprises the identified static portion, a function that corresponds to the one of the values in the breadcrumb information, and the identified sequence of transforms.

* * * * *